United States Patent [19]

Smith et al.

[11] 4,030,136
[45] June 14, 1977

[54] FLEXIBLE DISK PACK ACCESSING APPARATUS AND METHOD

[75] Inventors: James Taylor Smith, Boulder, Colo.; Frank Eberhard Talke, Morgan Hill, Calif.

[73] Assignee: International Business Machines Corporation, Armonk, N.Y.

[22] Filed: Feb. 13, 1976

[21] Appl. No.: 658,134

[52] U.S. Cl. .............................................. 360/98
[51] Int. Cl.² ................... G11B 5/012; G11B 23/02
[58] Field of Search ............. 360/98, 99, 102, 133, 360/80; 346/137; 360/105

[56] References Cited

UNITED STATES PATENTS

| | | | |
|---|---|---|---|
| 3,867,723 | 2/1975 | Penfold | 360/98 |
| 3,936,880 | 2/1976 | McGinnis | 360/98 |
| 3,940,794 | 2/1976 | Griffiths | 360/98 |

Primary Examiner—Robert M. Kilgore
Attorney, Agent, or Firm—Henry E. Otto, Jr.

[57] ABSTRACT

Record storage apparatus including a pack of coaxially arranged rotating flexible disks uniformly spaced by means providing interstices through which pressure fluid is normally supplied at a preselected flow rate to maintain the disks stabilized in substantial parallelism during rotation. The pack is split at a selected axial position to cause a disk at each side of the split to spread and create a gap into which a transducer is insertable. A movable means concentrically disposed within the pack and positioned at the said selected position sealingly isolates the interstices at one side of the split from those at the opposite side. After insertion of the transducer, flow rate of pressure fluid to the disks at one side of the movable means is increased to restore the disks at said side to stabilized condition and concurrently fluid pressure load the particular disk at one side of said gap operatively against the transducer. Upon withdrawal of the transducer, flow rate of pressure fluid to the disks at the opposite side of the movable means is temporarily increased to restore said disks to stabilized substantial parallelism; then flow rate is concurrently reduced to said preselected rate at both sides of said movable means preparatory to accessing another of the disks.

13 Claims, 8 Drawing Figures

FLEXIBLE DISK PACK ACCESSING APPARATUS AND METHOD

RELATED PATENT APPLICATIONS ASSIGNED TO THE SAME ASSIGNEE AS THE PRESENT INVENTION

1. McGinnis, etal., Ser. No. 484,830, filed July 1, 1974, entitled "Bistable Deflection Separation of Flexible Disks" now U.S. Pat. No. 3,936,880.
2. Orlando, et al., Ser. No. 628,622, filed Nov. 4, 1975, entitled "Internal Division Actuation of Ventilated Floppy Disk Stack."
3. Orlando, Ser. No. 628,623, filed Nov. 4, 1975, entitled "Internal Division Actuation of Ventilated Floppy Disk stack."
4. Griffiths, et al., Ser. No. 633,320, filed Nov. 19, 1975, entitled "Fluidic Transducer Access Opening in a Stack of Flexible Record Disks."

BACKGROUND OF THE INVENTION

This invention relates to record storage apparatus comprising a stack of coaxially arranged flexible record storage disks, and relates more particularly to apparatus and methods for accessing a record surface on a selectable one of the disks in the stack in a manner that enables said record surface to be resiliently fluid pressure loaded into operative contact with the transducer.

The above-identified related patent applications disclose and claim apparatus and methods for generating access to a record surface in a stack of rotating flexible disks by applying a jet of pressure fluid in a generally radial direction to separate a selectable disk from its immediately adjacent disk, thereby to create a gap into which a transducer is insertable for operative contact with the record surface of the selected disk. The jet of pressure fluid may be applied by an air jet knife that is movable in a radial direction radially inwardly and outwardly from adjacent the periphery of the pack. Alternatively, the jet of pressure fluid may be applied via at least one port in the periphery of a member that is slidably positioned in alignment with the point at which the pack is to be split, pressure fluid being supplied to such port via a hollow control rod and internal opening in the member. This member is sealingly slidable in a bore within the disk pack so as to isolate the interstices between the disks at one side of said port from the port and from the interstices between the disks at the opposite side of said port. In most of the related applications, pressure fluid at an identical preselected flow rate was supplied to both sides of the member to normally maintain all disks of the pack in stablized substantially parallel relation until the pack was split by the jet of pressure fluid, assisted in the case of reference (4) above by preapplication of a vacuum between a pair of axially spaced jet ports.

Although the apparatus and methods disclosed in these related applications were generally satisfactory, there is a need for a somewhat less complex apparatus and method for facilitating access of a transducer to a record surface of a selected disk, while at the same time desirably providing for a resilient fluid pressure loading of the record surface operatively against the transducer and also creating a stable (i.e., smoother) recording platform.

SUMMARY OF THE INVENTION

Toward this end and according to the invention, after the pack is split to provide access by the transducer to the record surface of the selected disk, the flow rate to the interstices between disks to the record surface side of the split is increased to restore said disks to stabilized condition and concurrently fluid pressure load said record surface into operative contact with the transducer. "Operative contact" or "effective contact" is defined as actual physical contact or a proximity sufficient for transducing purposes but involving a slight fluid film separation (e.g. by an air bearing surface) between the transducer and record surface created by or resultant from rotation of the selected disk.

A further object is to assure that after the transducing operation is completed, the transducer can be withdrawn without abrasive action on the record surface (preferably due to the fluid film separation) ; and at an appropriate time during this withdrawal, flow rate of pressure fluid to disks at the opposite side of the split will be increased to restore said disks to stabilized condition, such that disks on both sides of the axial location at which the split had been effected will once again quickly be restored to substantial parallelism. Flow of pressure fluid to all disks is then reduced to a preselected rate in a "bistable" range, preparatory to accessing the record surface of another one of the disks.

An additional object is to proportion fluid flow to the disks at opposite sides of the transducer so that irrespective of the axial location of the transducer access split, flow through the respective interstices at a given side of the split will be equal. Of course, flow through each interstice at one side of the split will substantially equal flow through each interstice at the opposite side of the split only when all disks are connected to sources of fluid at the same pressure. Where, as in the novel conditions hereinafter described, interstices at one side of the split are connected to a source at one pressure and those at the opposite side are connected to a source at another pressure, the fluid flow will be proportioned equally only to all interstices connected to the same source.

The foregoing and other objects, features, and advantages of the invention will become apparent from the following more particular description of a preferred embodiment thereof, as illustrated in the accompanying drawings.

DETAILED DESCRIPTION

Figure 1:
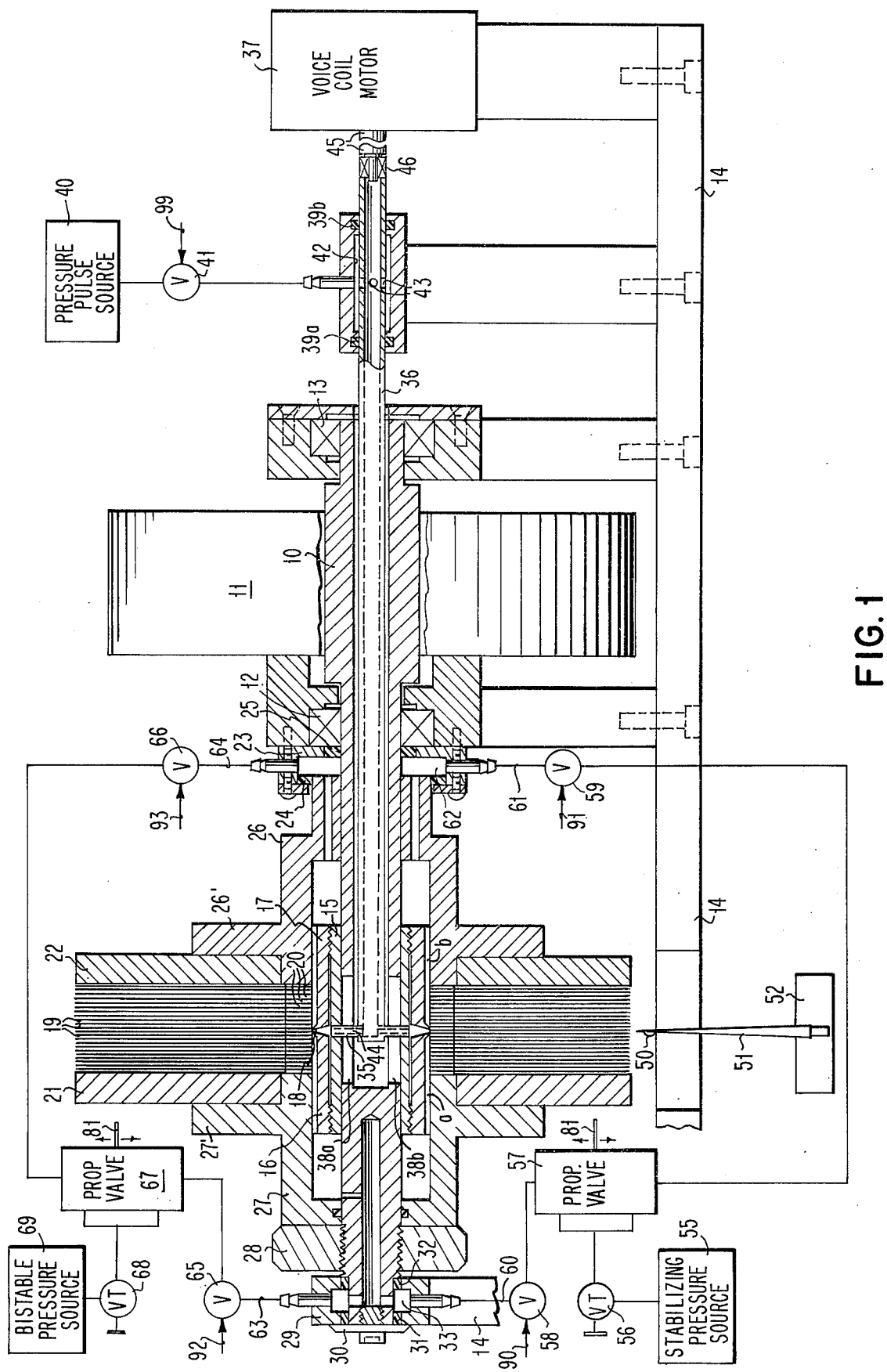
FIG. 1 is a view, partially in longitudinal section and partially schematic for sake of simplified illustration, of an apparatus constructed according to one embodiment of the invention.

As illustrated in FIG. 1, the flexible disk pack apparatus embodying the invention comprises a spindle 10, rotatably driven as by a motor 11, and cantilever journaled for rotation in bearings 12, 13 supported in spaced relation by a frame 14. Slidably mounted on spindle 10 is a movable assemblage comprising a spindle-encircling sleeve 15 onto which are screw threaded two complementary hollow members 16, 17. These members have a plurality of circumferentially spaced, axially extending flutes a, b, respectively, that extend axially toward each other but do not meet. The adjacent ends of each member 16, 17 are beveled and backed off from tight screw-threaded contact a few mils to provide a narrow circumferential slit 18.

In the embodiment illustrated, a jet pulse of fluid will be applied outwardly through slit 18 to initiate separation of a plurality of ultra thin Mylar flexible disks 19 of uniform diameter that encircle the members 16, 17 and are separated by smaller diameter annular spacers 20 that are either of porous fabric or are of metal with etched radial fluid-conveying conduits.

The disks 19 with intervening spacers 20 are retained between stabilizing annular end plates 21, 22 to create a pack or stack of closely spaced coaxial flexible disks. As illustrated, the pack is mounted on the spindle 10 for rotation thereby in the following manner. A collar 23 is slipped over spindle 10 into lateral contact with the upright portion of frame 14 supporting spindle bearing 12. Rotation of collar 23 is prevented by Telflon bearing seals 24, 25. Seal 24 encircles one end portion of a clamping member 26, the other end portion of which (including a flange 26') bears against one end of the disk pack. A clamping member 27 generally complementary to member 26 has an end portion including a flange 27' that bears against the other end of the disk pack. A clamping nut 28 screw threaded onto the spindle bears against the unflanged end of member 27 to provide a clamped assemblage 26, 27, 19, 20, 28 that is rotated at constant angular velocity by motor 11. A collar 29 is mounted over spindle 10, held in place by a nut 30 and prevented from rotating by Teflon bearing seals 31, 32 disposed at opposite axial sides of an annular chamber 33.

Movable assemblage 15, 16, 17 is disposed in an elongated, spindle-encircling chamber within clamped assemblage 26, 27, 19, 20. Assemblage 15, 16, 17 is rotated by spindle 10 through a pin 35 but is movable axially relative to the spindle in increments by a hollow rod 36 under control of a voice coil motor 37. More specifically, pin 35 is hollow, is radially aligned with slit 18, extends diametrically through rod 36 and axially extending slots 38a, b in spindle 10, terminating in sleeve 15. Rod 36 is disposed within and projects axially beyond a central bore in spindle 10 and is rotated by the spindle through pin 35. The projecting end portion of rod 36 is rotatably supported in O-ring seals 39a, b carried by frame 14.

A source 40 of pressure fluid is connectable to slit 18 via a solenoid valve 41, a sealed annular chamber 42 in frame 14, radial ports 43 and radial port 44 in hollow rod 36, and hollow pin 35.

Voice coil motor 37 may be of conventional type operable to axially shift a rod 45 an incremental amount corresponding to the magnitude of applied voltage. Rod 45 is connected to rod 36 by a bearing 46 to prevent rotation of rod 45 by rod 36; as further precaution, rotation of rod 45 may be constrained by suitable means (e.g. a spline connection, not shown). The structure thus described will translate axial motion of voice coil motor rod 45 into corresponding axial motion of the slit 18 as it is rotated in unison with the flexible disk pack assemblage.

A transducer 50, such as a head, is embedded in one side of an extensible arm 51 that is movable radially of the disks 19 by means (not shown) included within a carriage 52 that is movable parallel to the axis of spindle 10, in a manner disclosed in the referenced applications and not particularly relevant to the present invention.

As illustrated, a source 55 of stabilizing pressure fluid is connected via a throttle valve 56 to the inlet of a proportioning valve 57. Valve 57 has two outlets, connected to solenoid valves 58, 59, respectively. The total fluid flow, as determined by the setting of valve 56, is apportioned between the outlets in the manner presently to be explained when valves 58, 59 are concurrently open for supplying pressure fluid via lines 60, 61, respectively, to chambers 33 and 62. Chambers 33, 62 are also connected via lines 63, 64 to solenoid valves 65, 66, respectively, that are connected to respective outlets of a proportioning valve 67. Pressure fluid is supplied to the inlet of valve 67 via a throttle valve 68 from a source 69 of bistable pressure fluid.

Figure 2:
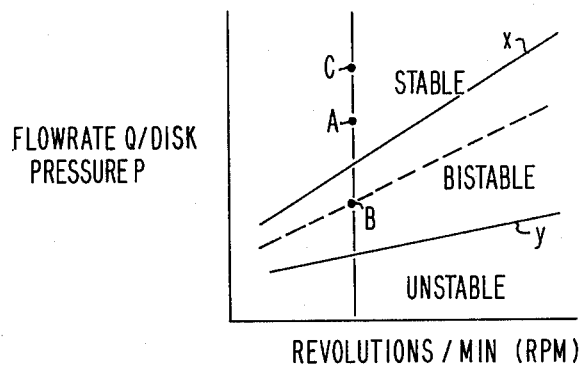
FIG. 2 is a graph depicting relative variations of fluid flow rate per disk and pressure with respect to revolutions per minute (RPM).
Figure 3A:
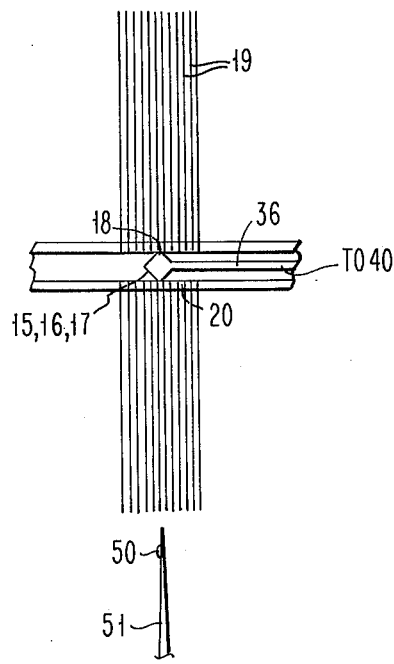
FIGS. 3A, 3B and 3C are schematic representations, illustrating the relative positions assumed by disks of the disk pack of FIG. 1 during the sequential steps followed in practicing the method of the invention.
Figure 3B:
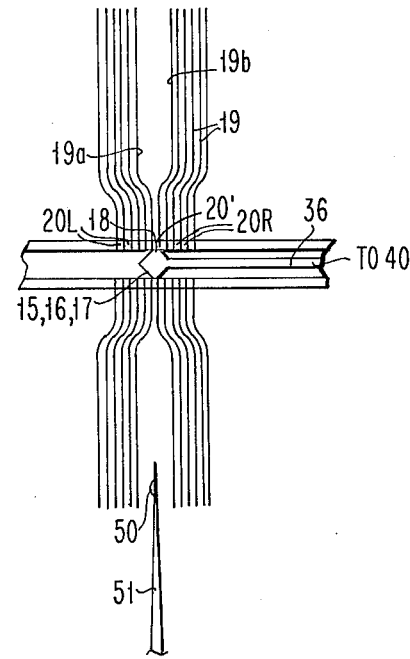

FIG. 2 constitutes a family of curves that indicate how fluid pressure P (e.g., in Newtons/mm$^2$) and, correspondingly, the flow rate Q (e.g., in mm$^3$/sec) required through the interstices between each disk 19 vary with RPM. Curves x, y indicate the upper and lower limits, respectively, of a bistable operating range. When pressure and flow rate are increased to a value above curve x (e.g., to value A), the disks 19 will always assume a stabilized condition in which all disks are essentially parallel as depicted in FIG. 3A. If pressure and flow rate are now reduced (e.g., to a preselected value B in the bistable range, preferably midway between curves x, y), disks will remain substantially parallel, unless and until some internal or external mechanical or pressure pulse means causes them to split and remain spread as shown in FIG. 3B. If pressure and flow rate are reduced to a value below curve y, the disks will become unstable and flutter uncontrollably.

Proportioning valve 57 (see FIG. 6) is operative to provide substantially uniform flow rates of pressure fluid between each disk 19 from source 55 irrespective of the axial position of slit 18. Thus, with valves 58, 59 open, the flow through lines 60, 61 is so apportioned that with slit 18 at the left end L of the pack, there is substantially no flow through line 60 and maximum flow through line 61; and, conversely, with slit 18 at the right end R of the pack, substantially all fluid will flow through line 60. With silt 18 at any given point intermediate L and R, total flow will be proportioned between lines 60, 61 generally by the ordinate values of curves Q-60 and Q-61, respectively.

It is to be understood that valve 67 will operate in similar manner to apportion flow from bistable pressure source 69 to lines 63, 64 and hence to the disks 19 to the left and right, respectively, of slit 18.

Figure 6:
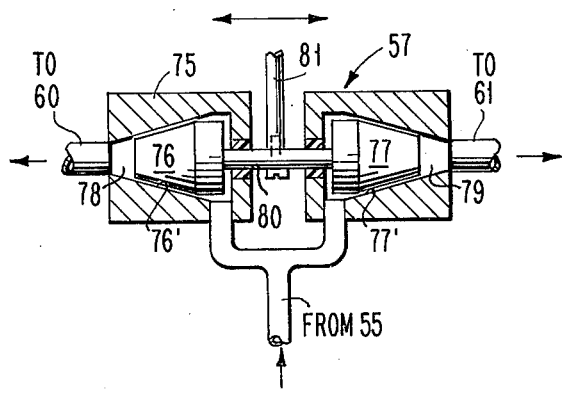
FIG. 6 is a sectional view illustrating one form of proportioning valve which will provide the total flow proportioning characteristics schematically illustrated in FIG. 5.

As illustrated in FIG. 6, proportioning valve 57 may comprise a sectionalized housing 75 providing two complementary tapered valves 76, 77 disposed in respective tapered valve chambers 78, 79 and coaxially connected back-to-back to a common shaft 80. Shaft 80 is operatively connected by a rod 81 and other suitable means (not shown) to move axially in unison with movable assemblage 15, 16, 17 and hence slit 18. For example, such means could include a sensing element which translates axial movement of voice coil rod 45 electromechanically into movement of rod 81 and shaft 80. With slit 18 positioned at the axial midpoint of the disk pack, as shown in FIG. 1, valves 76, 77 will be disposed as shown in FIG. 6 to divide the fluid flow from source 55 substantially equally. As shaft 80 is shifted leftward, valve 76 will move toward its tapered valve seat 76' and valve 77 will move away from its valve seat 77', thus decreasing flow to line 60 and increasing flow to line 61; and conversely.

In operation, assume initially that motor 11 is rotating spindle 10, rod 36, axially movable assemblage 15, 16, 17 and disk pack assemblage 19, 20, 26, 27, 28 in unison at a preselected constant angular velocity; that movable assemblage 15, 16, 17 and hence slit 18 are positioned as shown in FIG. 1; that valves 56, 58 have been preadjusted to provide desired flow rates of fluid at pressures A and B, respectively (see FIG. 2); that valves 65, 66, 41 are closed; and that solenoid valves 58, 59 are opened by electrical signals concurrently supplied to leads 90, 91, respectively. Under these conditions, fluid at the same pressure A will be applied via lines 60, 61 to both ends of movable assemblage 15, 16, 17 and via flutes $a$, $b$ and spacers 20 to cause all disks 19 to assume the stabilized condition in which they are shown in FIG. 1.

With stabilization thus assured, electrical signals will be supplied at time t1 to leads 92, 93 to open solenoid valves 65, 66, respectively, and removed from leads 90, 91 to close valves 58, 59. Thus, fluid will continue to be supplied to both ends of assemblage 15, 16, 17 and via spacers 20 but will drop in pressure from A to B, with a consequent reduction in flow rate per disk. The disks 19 will remain stabilized as shown in FIg. 1 (and schematically for sake of simplified illustration in FIG. 3A) in what now becomes the normal or parallel one of two essentially bistable states of the disk pack, until the disk pack is caused to split at a selected axial position; whereupon the disks will deflect and cause the pack to assume the other or divergent bistable state, schematically illustrated in FIG. 3B.

This splitting of the pack and creation of a gap for receiving the transducer 50 may be effected by external or internal means. As illustrated, it is effected by supplying a fluid pressure pulse via slit 18 to that spacer (designated 20') which separates the selected record surface 19a disk 19 from the adjacent surface 19b (FIG. 3B) of the adjacent disk 19. Hence, before the slit 18 is pulsed, the voice coil motor 37 (acting through rods 45, 36 and pin-in-slot connection 35, 38a, b, and spindle 10, and movable assemblage 15, 16, 17) moves slit 18 axially to adjacent the above-defined selected record surface 19a while the all of the above except motor 37 and rod 45 are rotated in unison by motor 11.

Figure 4:
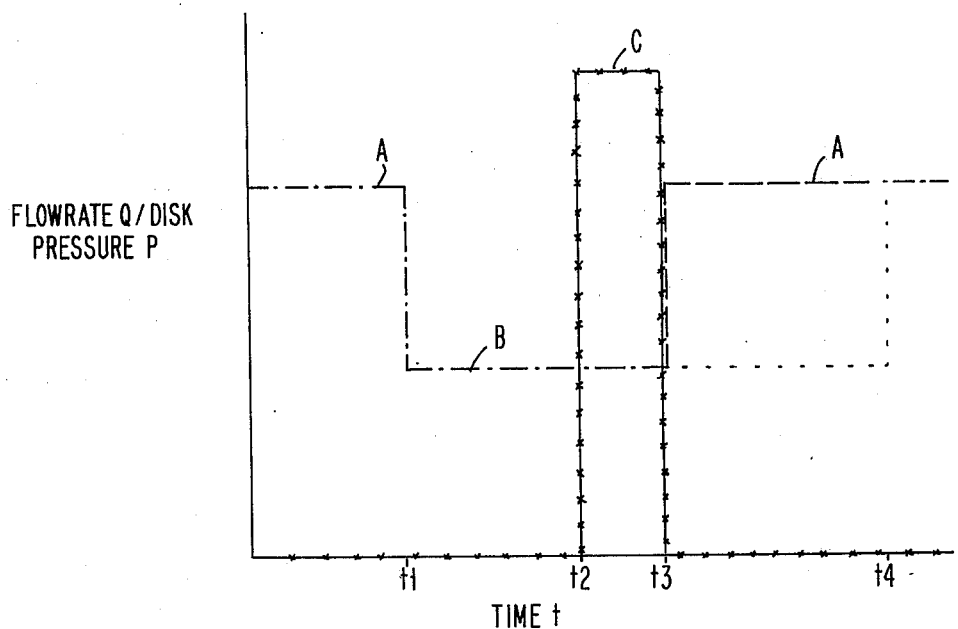
FIG. 4 is a graphical representation of the relative values of flow rate per disk and/or total pressure as a function of time to implement the novel sequence of steps inherent in practising the method of this invention.
Figure 5:
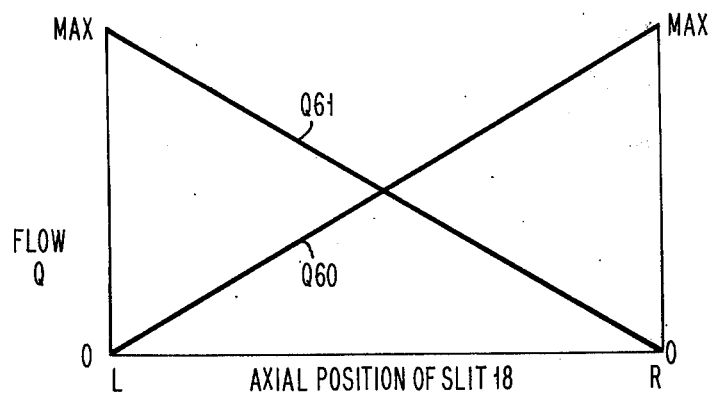
FIG. 5 is a diagram showing the flow rate proportioning characteristics of a proportioning valve preferably employed in the apparatus and method embodying the invention to split flow from a selected source position of the split-inducing medium and/or transducer.

With slit 18 thus positioned, solenoid valve 41 is momentarily opened from time t2 to time t3 by an electrical pulse to lead 99 to supply a pulse of pressure fluid at a relatively high pressure C (see FIGS. 2, 4) to slit 18 via 42, 43, 44, 35. This pressure pulse will cause the pack to assume the divergent bistable condition (see FIG. 3B) above described. As the gap is created at spacer 20', transducer 50 will be moved radially inward to the appropriate extent adjacent the record surface 19a.

Note that fluid at bistable pressure is being continually supplied during this period from source 69 to both ends of assemblage 15, 16, 17 and to the spacers 20L and 20R to the left and right of spacer 20'. Hence, upon termination of pulse C, the pack would normally remain in the position shown in FIG. 3B.

Figure 3C:
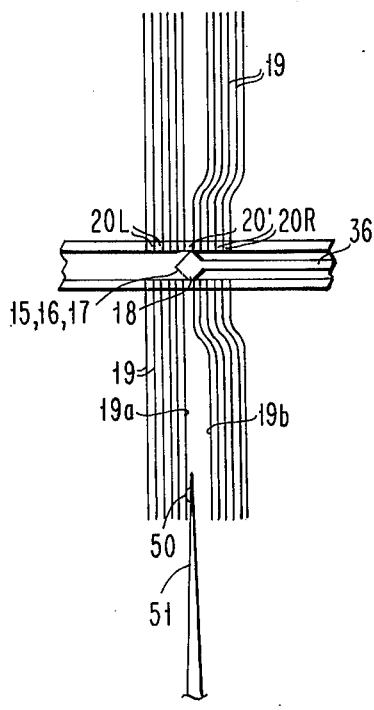

According to an important feature of the invention, however, at the time of, or shortly before or after termination of pressure pulse C at time t3, pressure and flow rate of fluid supplied to spacers 20L and hence acting on disks 19 to the left of transducer 50 is increased to value A by closure of valve 65 and opening of valve 58, while pressure and flow rate of fluid supplied to spacers 20R and hence acting on the disks 19 to the right of transducer 50 is maintained at value B. As a result, flow rate through line 60 increases and restores all the disks leftward of spacer 20' and transducer 50 to their parallel stabilized positions, while disks immediately rightward of transducer 50 remain deflected in their divergent bistable positions, as shown in FIG. 3C. As the leftmost disks stabilize, the record surface 19a will be thus brought into "operative contact" or "effective contact" (as hereinabove defined) with the transducer 50 for initiating a transducing operation.

When this transducing operation is completed, transducer 50 is fully withdrawn (protected, in the preferred embodiment, by the air bearing surface between it and record surface 19a). At a time t4 during this withdrawal (preferably toward the final stage thereof) the pressure and flow rate of fluid supplied to spacers 20R and hence acting on the disks 19 to the right of transducer 50 is increased to value A (see FIGS. 1, 2, 4) by closure of valve 59 and opening of valve 66. With pressure A now acting on disks on both sides of the spacer 20', restoration of all disks to stabilized position will be assured; and the disks will resume the respective positions in which they are shown in FIGS. 1 and 3A.

In preparation for the next transducing operation, the slit 18 and withdrawn transducer 50 are positioned by voice coil motor 37 and carriage 52, respectively, in axial alignment with the next record surface to be selected. Meanwhile, the pressure and flow rate of fluid supplied through all spacers 20L and 20R at opposite sides of 20' is now reduced from A to B, in a manner similar to that above described as occurring at time t1, thus completing a full cycle of operation.

Using applicant' novel apparatus and method, as hereinabove described, highly satisfactory results have been achieved using 12-inch diameter Mylar disks 19 which are rotated at 1800 revolutions per minute, with a set of preferably at least 20 buffer disks (not used for recording) at the ends of the pack adjacent each end plate 21, 22. Under these conditions, using 1.5 mil thick disks 19 separated by 3 mil thick radially etched spacers 20, bistable flow rate per disk (as indicated at B in FIG. 2) was 450 mm$^3$/sec. With 3 mil disks and 6 mil spacers, bistable flow rate was about 1800 mm$^3$/sec.,; required flow rate per disk was found to increase roughly fourfold upon this doubling of the disk thickness and spacing. The value of A should be about 1.5 to 10 times (preferably about 2 to 3 times) that of B; and the value of C equal to or greater than that of A. In each case, all pressure sources will provide pressure fluid at pressures slightly above atmospheric, sufficient to overcome the vacuum that would normally and otherwise be developed by centrifugal action of the rotating disks.

As earlier suggested, variations of the invention to incorporate certain features heretofore proposed in the above-referenced related applications will be apparent to those skilled in the art. For example, the disk pack may be split by an external air jet (e.g., supplied via a port in the transducer supporting arm 51), or by an external air knife (that could also carry the transucer 50). In either case, there would be no need for a pressure source 40 and hence the structure could be simplified considerably by eliminating slit 18, while continuing to provide a sealing separation between flutes a, b.

But in the illustrated embodiment and variations above discussed, the application of the increased pressure and flow rate A to disks leftward of the selected record surface 19a after splitting of the pack and insertion of the transducer will restore such disks to their parallel stabilized position; and, in so doing, the disk will desirably be loaded against the transducer. With pressure thus increased on disks leftward of selected record surface 19a, the recording head 50 experiences less change in force, as it moves from track to track, than it would if pressure remained at the lower value B. This makes it easier to fly the head reliably.

With prior arrangements, relatively large loads of about 20 grams had to be applied to the transducer to provide sufficient damping action, leading to significant wear during physical contact of the transducer with the record surface; and since the recording surface did not provide a highly stable platform, some physical contact occurred intermittently even in so-called flying transducer configurations. By contrast, with the arrangement herein disclosed, a very stable recording surface is provided for a very close flying transducer; and in those configurations where actual physical contact is desired or required, the relative loading force of the transducer to recording surface is reduced to the order of about several grams.

It will also be understood that, if desired, recording may be effected on both surfaces 19a, b of the respective flexible disks 19. This could be achieved by providing another transducer (not shown) embedded in the extensible arm 51 at the side opposite transducer 50. Or, if preferred, another extensible arm (not shown) could be provided identical with arm 51 but displaced diametrically opposite arm 51 and turned 180° about its axis so the transducer faces rightward (instead of leftward) as viewed in FIG. 1. The valving arrangement herein illustrated will enable this selective recording on either surface of the disks according to whether the pressure and flow rate of fluid supplied to one set of spacers 20L or 20R (and hence acting on the disks to the left or right, respectively, of the transducer) is increased to value A while the pressure and flow rate of fluid to the other set of spacers is maintained at value B.

While the invention has been particularly shown and described with reference to a preferred embodiment thereof, it will be understood by those skilled in the art that various changes in form and details, including but not limited to those suggested, may be made therein without departing from the spirit, scope and teaching of the invention. Accordingly, the apparatus and method herein disclosed are to be considered merely as illustrative and the invention is to be limited only as specified in the claims.

What is claimed is:

1. A record storage apparatus comprising, in combination,
    a pack of closely spaced coaxially arranged interconnected rotary flexible disks,
    means for normally supplying pressure fluid at a preselected flow rate to interstices between said disks to maintain the pack, during rotation, in a normal condition in which the disks are substantially parallel,
    means for splitting said pack at a selected axial position to cause disks at each side of the split to be deflected apart and assume respective diverging positions, and
    a movable means concentrically disposed within the pack and positioned at said selected position for sealingly isolating the interstices at one side of the split from those at the opposite side,
    the first-mentioned means including means for providing pressure fluid at a flow rate higher than said preselected flow rate to one side of the movable means for restoring disks at said one side to substantially parallel positions while disks at the opposite side remain in their diverging positions.

2. A record storage apparatus according to claim 1, including a transducer insertable into the gap created by the split,
    the particular disk directly adjacent said one side of said gap being fluid pressure loaded operatively against said transducer as an incident to restoration of disks at said one side to their parallel positions.

3. A record storage apparatus according to claim 1, wherein said first-mentioned means includes means for providing pressure fluid at a flow rate higher than said preselected flow rate at said opposite side of the movable means for restoring disks at said opposite side to their substantially parallel positions following the restoration of the disks at said one side to their substantially parallel positions.

4. A record storage apparatus according to claim 1, including
    a transducer,
    means for moving said transducer into the gap created by the split to perform a desired transducing operation while in operative contact with a planar surface of an adjacent one of said disks, and wherein
    said adjacent disk is fluid pressure loaded laterally against said transducer as an incident to restoration of the disks at said one side to stabilized condition,
    said first-mentioned means further including means for providing pressure fluid at a flow rate higher than said preselected flow rate at said opposite side of the member for restoring the disks at said opposite to their substantially parallel positions upon retraction of the transducer by said moving means.

5. A record storage apparatus according to claim 1, including valve means associated with said first-mentioned means and movable means for varying the respective volumes of pressure fluid supplied to the interstices at each side of said movable means as necessary to provide a substantially uniform rate of fluid flow through the interstices between each disk irrespective of the particular selected position of said movable means and consequent point of sealing isolation when flow is at said preselected rate to maintain all disks substantially parallel.

6. A record storage apparatus according to claim 1, wherein said means for splitting said pack comprises means for applying a jet of pressure fluid between adjacent disks at said selected axial position.

7. A record storage apparatus according to claim 6, wherein said means for applying the jet of pressure fluid comprises:
a hollow rod for conveying pressure fluid and controlling movement of said movable means to the selected axial position,
said movable means having at least one peripheral opening establishing communication between the hollow rod and a selectable one of the interstices.

8. A method of controlling operative contact between a transducer and a selectable one of a pack of coaxially arranged flexible annular record disks that, while being rotatably driven, normally are maintained uniformly spaced and substantially parallel by a radially outward flow of fluid at a preselected flow rate through interstices between said disks, said method comprising the steps of:
supplying a jet of pressure fluid to a selected interstice between a selected disk and its immediately adjacent disk at a pressure sufficient to create a gap between the facing surfaces of these disks,
inserting the transducer generally radially into said gap while maintaining flow of fluid substantially at said preselected rate against the non-facing surfaces of said selected disk and adjacent disk, and
thereafter increasing the rate of flow of pressure fluid acting against said non-facing side but not said facing side of the selected disk to load the facing side of the latter resiliently into operative contact with the transducer.

9. A method according to claim 8, comprising the further steps of:
withdrawing the transducer from within the gap, and
increasing the flow of pressure fluid against said non-facing side but not said facing side of said adjacent disk to a rate higher than said preselected rate to close said gap and restore the latter disk to substantial parallelism with said selected disk preparatory to selection of another one of said disks.

10. A method according to claim 8, including the steps of:
increasing the rate of flow of pressure fluid to all interstices at the selected disk side of the selected interstice concurrently with the increase in flow rate against said non-facing side of said selected disk,
withdrawing the transducer form within the gap, and
during the final phase of removal of the transducer increasing the flow of pressure fluid to all interstices at the adjacent disk side of the selected interstice to a rate higher than said preselected rate to close said gap and cause all disks to be restored to substantial parallelism preparatory to selection of another one of said disks.

11. A method according to claim 10, including the step of:
decreasing the flow of pressure fluid to all interstices substantially concurrently to said preselected rate following such restoration of all disks to substantial parallelism.

12. A method according to claim 8, wherein disks at one side of the gap are sealingly isolated from disks at the opposite side of the gap by a movable means that conveys the gap-creating jet of fluid generally radially outward from a member disposed concentrically within and movable axially relative to the pack.

13. A method according to claim 8, including the steps of:
supplying the pressure fluid from means automtically operable to maintain flow between each disk at said preselected rate or higher rate, respectively, irrespective of the numbers of disks to either side of the selected interstice, and
sealingly isolating the selected interstice from the interstices to each side thereof.

* * * * *